(12) United States Patent
Svensson et al.

(10) Patent No.: US 11,187,180 B2
(45) Date of Patent: Nov. 30, 2021

(54) ABNORMAL COMBUSTION PROTECTION IN AN ENGINE AND PISTON CONFIGURATION FOR SAME

(71) Applicant: Caterpillar Inc., Peoria, IL (US)

(72) Inventors: Kenth I. Svensson, Peoria, IL (US); Jaswinder Singh, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 16/804,112

(22) Filed: Feb. 28, 2020

(65) Prior Publication Data
US 2021/0270204 A1 Sep. 2, 2021

(51) Int. Cl.
| F02F 1/00 | (2006.01) |
| F02B 3/06 | (2006.01) |
| F02F 1/16 | (2006.01) |
| F16J 9/20 | (2006.01) |

(52) U.S. Cl.
CPC .............. *F02F 1/004* (2013.01); *F02B 3/06* (2013.01); *F02F 1/16* (2013.01); *F02F 2001/006* (2013.01); *F16C 2360/22* (2013.01); *F16J 9/20* (2013.01)

(58) Field of Classification Search
CPC ......... F02F 3/00; F02B 23/00; F02B 23/0603; F02B 2023/0609; F02B 2023/0612
USPC .................................... 123/193.1, 193.3, 668
See application file for complete search history.

(56) References Cited

U.S. PATENT DOCUMENTS

| 1,839,458 | A | 1/1932 | Anglada | |
| 7,000,584 | B1* | 2/2006 | Wynveen | F02F 1/16 123/193.2 |
| 9,145,845 | B2* | 9/2015 | Hofbauer | F02F 3/0015 |
| 2004/0237776 | A1* | 12/2004 | Sytsma | C23C 28/044 92/172 |
| 2010/0288222 | A1 | 11/2010 | Urabe et al. | |
| 2013/0184974 | A1 | 7/2013 | Shieh et al. | |
| 2014/0298984 | A1* | 10/2014 | Hofbauer | F16J 9/02 92/169.1 |
| 2018/0266359 | A1* | 9/2018 | Beasley | F02F 1/00 |
| 2019/0113139 | A1* | 4/2019 | Machliner | F16J 9/20 |
| 2020/0248809 | A1* | 8/2020 | Mendes De Araujo | F16J 9/20 |
| 2020/0378332 | A1* | 12/2020 | Gaiselmann | F02F 1/004 |

FOREIGN PATENT DOCUMENTS

| CN | 108999717 | A | 12/2018 |
| CN | 109253252 | A | 1/2019 |
| GB | 509087 | A | 7/1939 |
| GB | 2164418 | A | 3/1986 |
| JP | 2010236649 | A | 10/2010 |

* cited by examiner

*Primary Examiner* — John Kwon
(74) *Attorney, Agent, or Firm* — Brannon Sowers & Cracraft

(57) ABSTRACT

An engine includes a cylinder liner and a piston movable within the cylinder liner, a crevice formed between a top land of the piston and the cylinder liner, and an oil entry clearance formed between a top ring of the piston and the cylinder liner. The engine also includes an abnormal combustion inhibitor having an oil recapture surface exposed to the crevice and oriented to limit migration of oil from the crevice toward a combustion chamber in the engine. The abnormal combustion inhibitor includes a groove structure having as a substrate at least one of the cylinder liner or the piston. Related methodology is also disclosed.

20 Claims, 6 Drawing Sheets

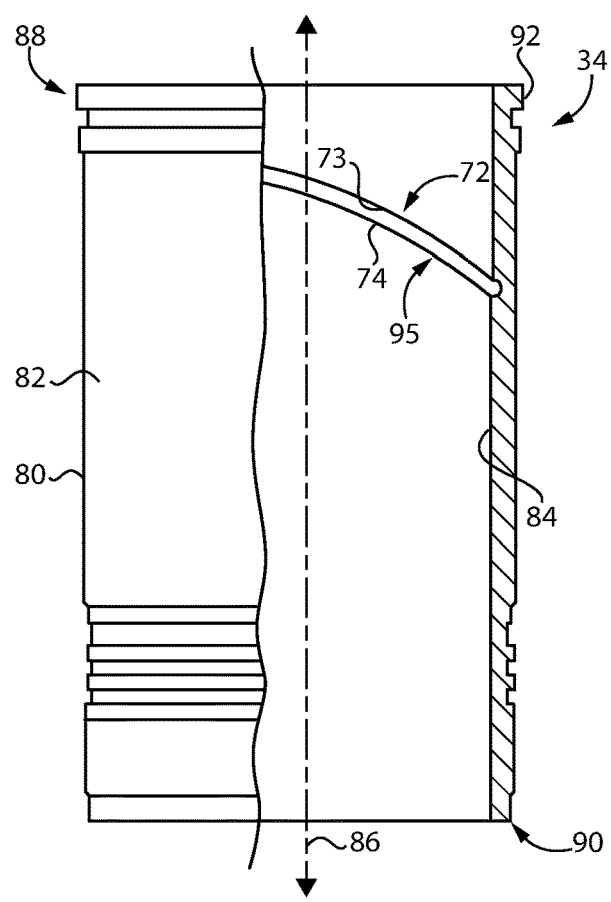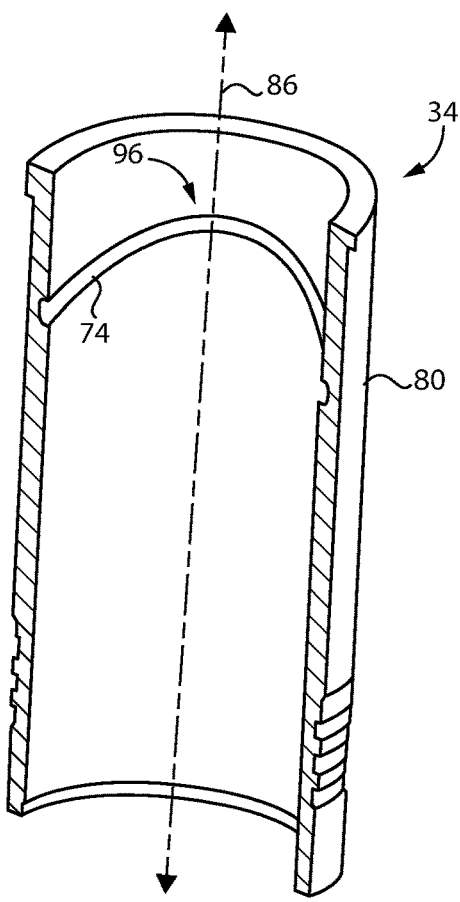
FIG. 9    FIG. 10
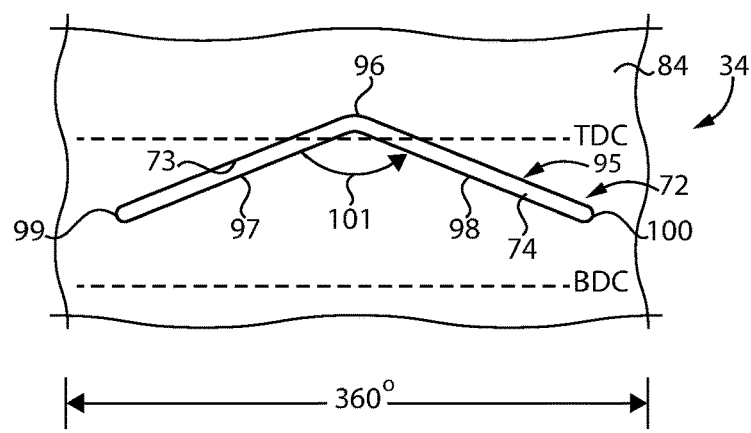
FIG. 11

ABNORMAL COMBUSTION PROTECTION IN AN ENGINE AND PISTON CONFIGURATION FOR SAME

TECHNICAL FIELD

The present disclosure relates generally to inhibiting abnormal combustion in an internal combustion engine, and relates more particularly to an abnormal combustion inhibitor having an oil recapture surface oriented to limit migration of oil from a crevice toward a combustion chamber in an engine.

BACKGROUND

In recent years increasingly stringent emissions requirements have motivated engineers to develop a variety of techniques for reducing certain constituents of exhaust from internal combustion engines. Some strategies relates to trapping or chemically transforming certain emissions constituents in the exhaust in an effort to limit discharging such undesirable constituents to the environment. Particulate filters and catalytic reduction devices are used, respectively, to trap particulates such as soot and ash, and to reduce oxides of nitrogen or NOx. Other strategies rely upon controlling properties of the combustion process itself and are sometimes used independently of, or in conjunction with, exhaust aftertreatment strategies.

It is well known that operating internal combustion engines on stoichiometrically lean ratios of fuel to air can provide certain advantages with regard to emissions. Among other factors, an excess of available oxidant in lean burn applications can assist in combusting fuel as completely as possible, and otherwise provide an advantageous emissions profile. Engineers have also leveraged the relatively cleaner burning properties of certain gaseous fuels, such as natural gas. For lean burn strategies to perform optimally, however, it can be generally desirable to control a timing and manner of combustion relatively precisely. In other words, combustion that commences too early, or too late, can frustrate efforts at successful operation. Certain combustion regimes can also be susceptible to abnormal combustion phenomena such as aggressive combustion, knock, misfire, or combustion stability problems. One example of a lean burn gaseous fuel engine application is known from U.S. Patent Application Publication No. 20150241306A1 to Sixel et al. In Sixel et al, incomplete combustion, such as misfire, is detected in an engine operated on gaseous fuel, presumably so that corrective action can be taken.

SUMMARY OF THE INVENTION

In one aspect, an engine includes an engine housing, and a cylinder liner supported in the engine housing and forming a combustion chamber. The engine further includes a piston movable between a top-dead-center (TDC) position and a bottom-dead-center (BDC) position in the cylinder liner. The piston includes an upper piston surface forming a combustion face, a lower piston surface positioned for impingement by engine oil, a top piston ring, and a top land extending between the top piston ring and the upper piston surface. The engine further includes a crevice formed between the top land and the cylinder liner, and an abnormal combustion inhibitor. The abnormal combustion inhibitor includes an oil recapture surface exposed to the crevice and oriented to limit migration of oil from the crevice toward the combustion chamber.

In another aspect, a method of operating an engine includes moving a piston in the engine between a bottom-dead-center (BDC) position and a top-dead-center (TDC) position, and combusting a mixture containing a gaseous fuel and air pressurized in the combustion chamber based on the moving of the piston between the BDC position and the TDC position. The method further includes conveying oil into a crevice formed between a top land of the piston and the cylinder liner, and impinging the oil conveyed into the crevice upon an oil recapture surface of an abnormal combustion inhibitor. The method still further includes limiting migration of the oil from the crevice toward the combustion chamber based on the impingement of the oil upon an oil recapture surface, so as to inhibit abnormal combustion in the combustion chamber.

In still another aspect, a piston for an internal combustion engine includes a piston body defining a piston center axis extending between a first axial piston body end including an upper piston surface forming a combustion face, and a second axial piston body end including a lower piston surface. The piston body further includes a top ring groove extending circumferentially around the piston center axis, and a top land extending circumferentially around the piston axis, and axially between the top ring groove and the combustion face. A top ring is seated in the top ring groove and includes an outer ring edge, and the outer ring edge is located radially outward of the top land, such that the piston is structured to form, together with an inner surface of a cylinder liner, a crevice extending circumferentially around the piston and radially outward from the top land, and an oil entry clearance to the crevice extending circumferentially around the top ring and radially outward from the outer ring edge. The piston further includes an abnormal combustion inhibitor having an oil recapture surface. The oil recapture surface is located axially between the top ring groove and the upper surface, and oriented according to an axial orientation component and a radial orientation component to limit migration of oil from the crevice toward a combustion chamber formed in part by the combustion face.

BRIEF DESCRIPTION OF THE DRAWINGS

FIG. 9 is a partially sectioned side diagrammatic view of a cylinder liner, according to one embodiment;

FIG. 10 is another sectioned view, in perspective, of the cylinder liner of FIG. 9;

FIG. 11 is an unrolled projection view of a portion of the cylinder liner of FIGS. 9 and 10;

DETAILED DESCRIPTION

Figure 1:
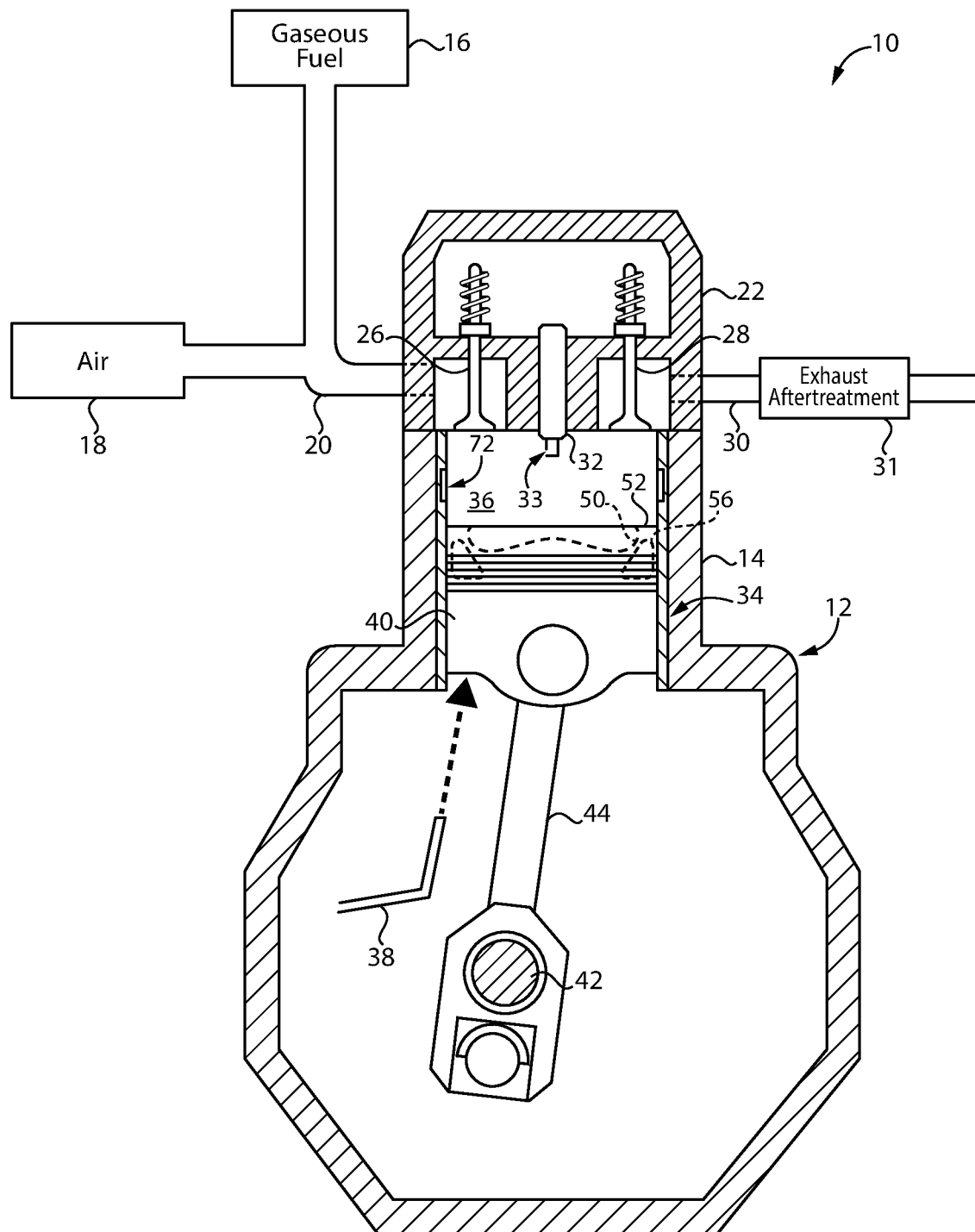
FIG. 1 is a partially sectioned side diagrammatic view of an engine, according to one embodiment.

Referring to FIG. 1, there is shown an internal combustion engine system 10 according to one embodiment, and including an internal combustion engine 12 having an engine housing 14, and a cylinder liner 34 supported in engine housing 14 and forming a combustion chamber 36. Engine system 10 can include a gaseous fuel engine having a gaseous fuel supply 16, and an air inlet 18, to provide a mixture of gaseous fuel and air, by way of an intake conduit 20 connecting to a cylinder head 22, to combustion chamber 36. Engine 12 also includes an engine valve 26 structured to control fluid connection between intake conduit 20 and combustion chamber 36, and another engine valve 28 structured to control fluid connection between combustion chamber 36 and an exhaust conduit 30. Exhaust conduit 30 can include an exhaust aftertreatment system 31. Combustion chamber 36 may include one of a plurality of similar combustion chambers in engine 12, in any suitable arrangement such as a V-pattern or an inline pattern. Suitable gaseous fuels can include natural gas, biogas, landfill gas, mixtures of these, or still others. A gaseous fuel, according to the present disclosure may include a fuel having a gaseous state at standard temperature and pressure, or a fuel suitable for supplying to combustion chamber 36 in a gaseous form such as premixed gasoline. Gaseous fuel supply 16 can include suitable vaporization and pressurization equipment to transform a gaseous fuel stored in a cryogenically liquefied state to a gas for supplying to combustion chamber 36. Gaseous fuel could be directly injected into combustion chamber 36, admitted into an intake manifold or an intake runner, or supplied into an intake conduit upstream a compressor in a turbocharger for example.

In the illustrated embodiment, engine 12 is spark-ignited and includes a spark gap 33 formed by an igniter 32 positioned within combustion chamber 36. In other embodiments, instead of employing spark plug-ignition engine 12 could be prechamber ignited, and igniter 32 could include a prechamber ignition device, for example, supplied with fuel and air from combustion chamber 36 or by way of a separate fuel supply. A prechamber ignition device could include a spark gap within a prechamber housing, for example. In still other embodiments, engine 12 could be a dual fuel engine where a premixed, or directly injected, main charge of gaseous fuel is ignited by a small or pilot charge of autoignited liquid fuel directly injected into combustion chamber 36. A piston 40 is movable between a top-dead-center (TDC) position and a bottom-dead-center (BDC) position in engine housing 14 relative to cylinder liner 34. Movement of piston 40 between the TDC position and the BDC position may pressurize a mixture containing a gaseous fuel and air for combustion by way of ignition with igniter 32. Engine 12 also includes a piston cooling jet 38 structured to produce an oil jet that advances toward an underside of piston 40. The oil jet may target a hole on the underside of piston 40 to supply oil for cooling purposes to an oil gallery 56. Engine oil may also splash toward and onto the underside of piston 40 from the crankcase. Oil sprayed, splashed, or otherwise supplied can make its way between piston 40 and cylinder liner 34, as further discussed herein. Piston 40 is coupled with a crankshaft 42 by way of a connecting rod 44 in a generally conventional manner.

Engine 12 may be structured to operate using a stoichiometrically lean mixture containing gaseous fuel and air, and potentially other components such as recirculated exhaust gas (EGR). Those skilled in the art will be familiar with advantageous combustion properties, notably low levels of certain emissions, that can be achieved with stoichiometrically lean combustion. It has been observed that migration of engine oil into a combustion chamber in a lean burn gaseous fuel engine can sometimes result in undesired combustion properties, including in some instances forms of aggressive combustion such as detonation or "knock". It is believed that engine oil sprayed or splashed, or otherwise conveyed toward and onto an underside of an engine piston that migrates up between the piston and walls of a combustion chamber can at least occasionally be conveyed into the combustion chamber itself and autoignite therein, leading to the undesired consequences. Autoignition of even relatively small amounts of engine oil can frustrate the purposes of lean burn operation with respect to emissions and oil consumption, and risks subjecting engine hardware to excessive pressure conditions that can lead to performance degradation or failure. As will be further apparent from the following description, engine system 10 is uniquely configured to inhibit aggressive or otherwise abnormal combustion during operation.

Figure 2:
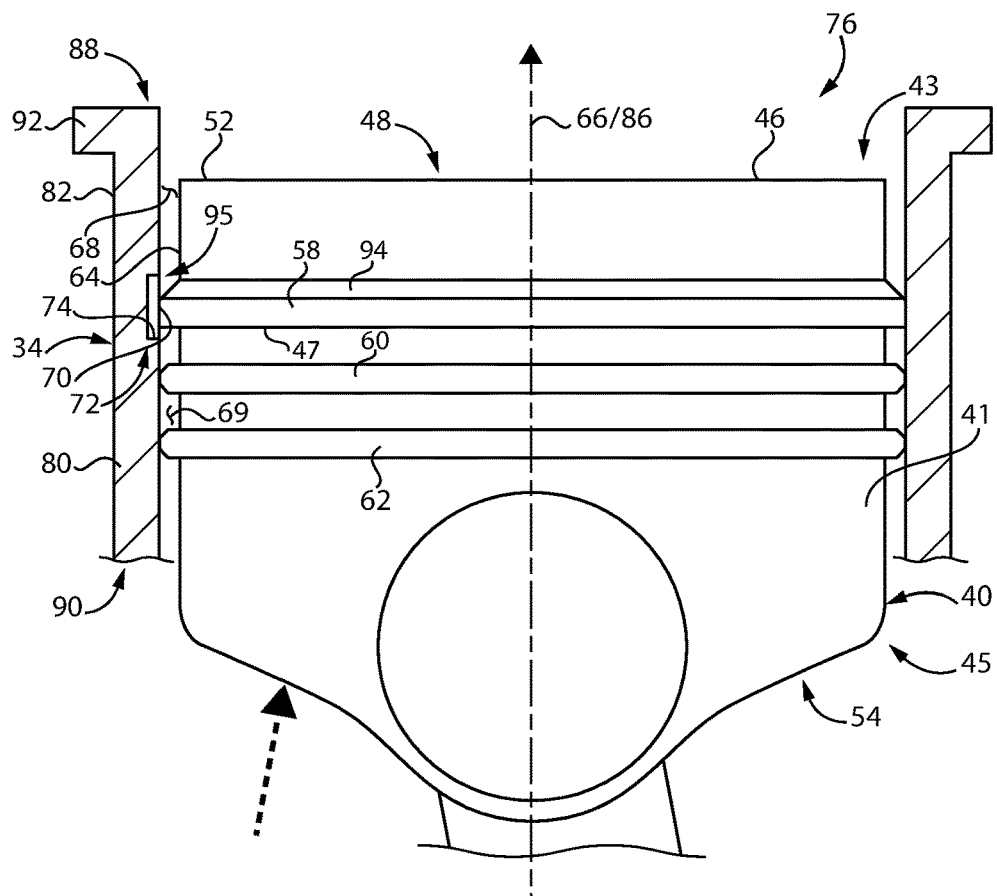
FIG. 2 is a partially sectioned side diagrammatic view of a cylinder liner and piston assembly, according to one embodiment.

Referring also now to FIG. 2, piston 40 includes an upper piston surface 46 forming a combustion face 48, a lower piston surface 54 positioned for impingement by the oil from piston cooling jet 38 and/or by oil splashed from the crankcase or otherwise supplied, a piston top ring 58, and a top land 64 extending between top ring 58 and upper piston surface 46. Piston 40 also includes a piston body 41 defining a piston center axis 66 extending between a first axial piston body end 43 that includes upper piston surface 46, and a second axial piston body end 45 that includes lower piston surface 54. Upper piston surface 46 may also have a combustion bowl 50 formed therein, and an annular piston rim 52 extending circumferentially around combustion bowl 50. Piston 40 also includes a middle ring 60, and a bottom ring 62. Piston 40 can include any suitable number of piston rings. Piston body 41 includes a top ring groove 47 extending circumferentially around piston center axis 66. Top land 64 also extends circumferentially around piston center axis 66, and axially between top ring groove 47, and upper piston surface 46/combustion face 48.

Top ring 58 is seated in top ring groove 47 and includes an outer ring edge 49. Outer ring edge 49 is located radially outward of top land 64, such that piston 40 is structured to form, together with an inner liner surface 84 of cylinder liner 34, a crevice 68. Crevice 68 extends circumferentially around piston 40, and radially outward from top land 64, such that crevice 68 is formed between top land 64 and cylinder liner 34. Cylinder liner 34 and piston 40 together form a cylinder liner and piston assembly 76. Piston 40 is also structured to form, together with inner liner surface 84, an oil entry clearance 70, between top ring 58 and cylinder liner 34, extending circumferentially around top ring 58 and radially outward from outer ring edge 49.

Figure 3:
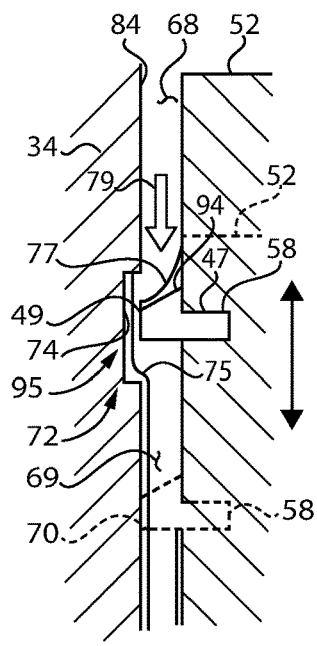
FIG. 3 is a sectioned diagrammatic view of a portion of the assembly of FIG. 2.

Referring also now to FIG. 3, as suggested above, during operation oil conveyed to lower piston surface 54 can, and is intended to, work its way up between piston 40 and cylinder liner 34 to assist in cooling and lubrication. In FIG. 3, a layer or film of oil 75 can be seen upon inner liner surface 84 as it might appear having been conveyed up through a sub-crevice volume 69. In FIG. 3, top ring 58 is shown in solid lines as it might appear approximately at the TDC position of piston 40, and in phantom lines as it might appear at the BDC position of piston 40. As piston 40 reciprocates up and down between the TDC position and the BDC position, the motion of top ring 58, and the other piston rings, can be expected to assist in distributing engine oil. Since oil entry clearance 70 resides between top ring 58 and cylinder liner 34, some engine oil will at least occasionally migrate through oil entry clearance 70 and into crevice 68. In FIG. 3, additional engine oil thusly migrated is shown at 77. Due to in-cylinder dynamics, or oil volume accumulation, or other factors experienced by engine 10, some of the additional oil 77 could be expected to migrate continuously, periodically, or sporadically, upward through crevice 68, toward and eventually into combustion chamber 36 but for features of engine 12 adapted to prevent such oil migration.

To this end, engine 12 includes an abnormal combustion inhibitor 72 including an oil recapture surface 74 exposed to crevice 68 and oriented to limit upward migration of oil from crevice 68 toward combustion chamber 36. Abnormal combustion inhibitor 72, including oil recapture surface 74, may be formed upon one or both of piston 40 or cylinder liner 34. In some embodiments, abnormal combustion inhibitor 72 includes a groove structure 95 having as a substrate at least one of cylinder liner 34 or piston 40. As further discussed herein, an oil recapture surface may include a groove surface or another surface upon piston 40 extending circumferentially around piston center axis 66. Additionally or alternatively, and as in the embodiment of FIGS. 2 and 3, oil recapture surface 74 may include a groove surface upon cylinder liner 34 and extending circumferentially around a liner center axis 86. As further discussed herein, the substrate of groove structure 95 may include both a piston and a cylinder liner in some embodiments.

As noted above, oil recapture surface 74 is oriented to limit migration of oil from crevice 68 toward combustion chamber 36, and in particular oriented to limit upward migration of oil along one or both of inner liner surface 84 or top land 64, or as a spurt or spray upward through crevice 68. The orientation and function of oil recapture surface 74 is intended to mitigate undesired phenomena as discussed herein regardless of the specific mechanism of oil migration occurring, which may vary engine to engine. In the embodiment of FIGS. 2 and 3, top ring 58 also includes structure cooperating with groove structure 95 to assist in returning at least some of oil 77 back to sub-crevice volume 69. To this end, top piston ring 58 includes an upper ring face 94 that slopes radially outward and downward in a direction of oil entry clearance 70. An arrow 79 is shown in FIG. 3 representing fluid pressure impingement produced by combustion of fuel and air in combustion chamber 36, and/or fluid compression in a compression stroke of piston 40, acting/directed downward generally into crevice 68. The slope of upper ring face 94 is believed to assist, in cooperation with fluid pressures, in urging oil 77 into groove structure 95. In the sectioned view of FIG. 3 the orientation of groove surface 74 is only partially apparent. As further discussed herein in view of additional illustrations, oil recapture surface 74 may include an axial orientation component and a radial orientation component. Upper piston surface 46 upon rim 52 has a radial orientation component, for example, but no axial orientation component. Top land 64 has an axial orientation component but no radial orientation component, for example. Upper ring face 95 has both axial and radial orientation components, for example. Groove structure 95 may also form an oil collection groove by way of oil recapture surface 74, as further discussed herein, that axially advances and circumferentially advances relative to liner center axis 86 and piston center axis 66, as also further discussed herein.

Figure 4:
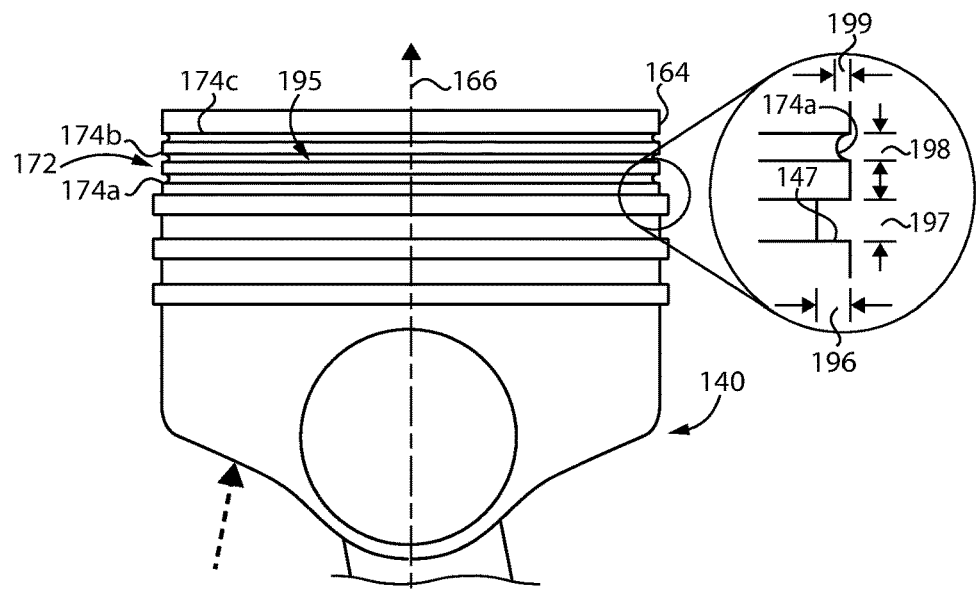
FIG. 4 is a side diagrammatic view of a piston, including a detailed enlargement, according to one embodiment.

Referring now to FIG. 4, there is shown a piston 140 according to another embodiment. Piston 140 has certain similarities with piston 40, but also certain differences. Piston 140 defines a piston center axis 166, and includes an abnormal combustion inhibitor 172. A top land is shown at 164, and abnormal combustion inhibitor 172 is located upon top land 164, adjacent to a top ring groove 147. Whereas the preceding embodiment included a groove structure upon a cylinder liner, abnormal combustion inhibitor 172 forms a groove structure 195 having as a substrate piston 140. Namely, abnormal combustion inhibitor 172 includes a plurality of oil recapture surfaces 174a, 174b, 174c, arranged at a plurality of axial locations upon top land 164. Each of oil recapture surfaces 174a, 174b, 174b, has the shape of, and forms, a groove that extends circumferentially around piston 140 upon and within top land 164. Surfaces 174a, 174b, 174c may include substantially identical surfaces forming substantially identical circumferential grooves.

The structure of oil recapture surfaces or "groove surfaces" 174a, 174b, and 174c may also be different from piston ring grooves of piston 140. Referring to the detailed enlargement of FIG. 4, there can be seen dimensional attributes of abnormal combustion inhibitor 172 and top ring groove 147. Top ring groove 147 includes an axial depth 197 and a radial depth 196. Oil recapture surface 174a is shown in the detailed enlargement, and includes an axial depth 198 and a radial depth 199. Radial depth 199 may be less than radial depth 196. Axial depth 198 may be less than axial depth 197. At least one of a groove depth (radial depth 199) or a groove width (axial depth 198) of groove surfaces 174a, 174b, 174c, may be less than, respectively, a groove depth (radial depth 196) or a groove width (axial depth 197) of top ring groove 147. It can also be noted from the detailed enlargement of FIG. 4 that a shape of groove surfaces 174a, 174b, 174c may be arcuate in profile, whereas a shape of the surfaces forming top ring groove 147, in profile, may be square, wedge shaped, or any other suitable shape. During service, oil beginning to migrate by way of surface flow, or as a spray or droplets, upward, upon or along top land 164 will tend to be diverted, broken up, and/or otherwise inhibited from upward migration from an associated crevice toward a combustion chamber above piston 140.

Figure 5:
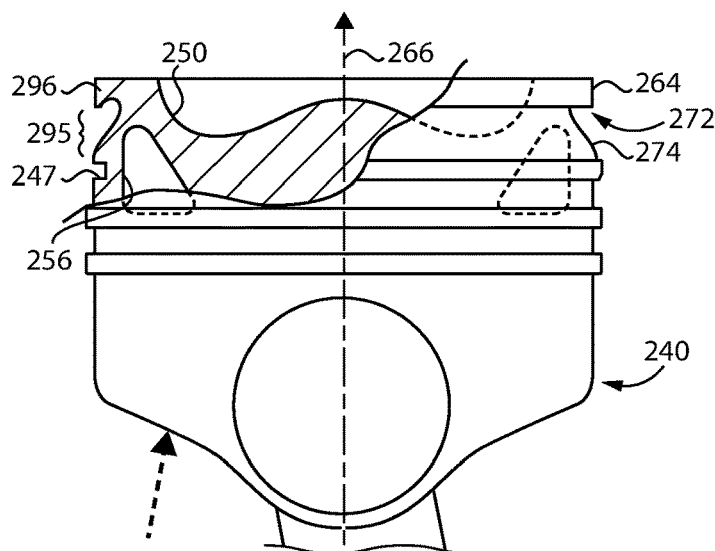
FIG. 5 is a partially sectioned side diagrammatic view of a piston, according to another embodiment.

Referring now to FIG. 5, there is shown a piston 240 according to another embodiment. Piston 240 defines a piston center axis 266, and includes a top ring groove 247, a top land 264, and an abnormal combustion inhibitor 272 having an oil recapture surface or groove surface 274. Also visible in the sectioned view of FIG. 5 is a combustion bowl 250 and an oil gallery 256. Oil gallery 56 in piston 40 of FIG. 1 may receive a jet of engine oil as may oil gallery 256 in the FIG. 5 embodiment, as well as other embodiments contemplated herein. Lower surfaces of the respective pistons can include, be adjacent to, or transition with surfaces forming oil galleries 56 and 256. Regardless of the specific oil conveyance mechanism, oil will eventually make its way out to the piston exterior and cylinder liner surfaces. Abnormal combustion inhibitor 272 may also include a groove structure 295, and in the illustrated case includes a single groove formed by groove surface 274 that is circumferential of piston center axis 266. Abnormal combustion inhibitor 272 also includes an overhang 296, with part of top land 264 being formed on overhang 296. Groove surface 274 is also formed at least in part upon an underside of overhang 296.

In the illustrated embodiment, oil recapture surface 274 has a profile that is recurving relative to piston center axis 166. Recurving means that parts of the surface are understood to advance in a first axial direction, and others advance in an opposite axial direction.

Figure 6:
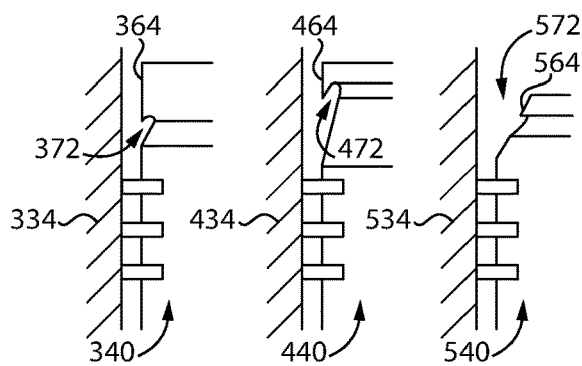
FIG. 6 is a comparative view of three different piston configurations.

Referring to FIG. 6, there are shown three comparative views of a piston 340, a piston 440, and a piston 540, with each of pistons 340, 440, and 540, shown as they might appear positioned within a cylinder liner 334, 434, and 534, respectively. Piston 340 includes a top land 364, piston 440 includes a top land 464, and piston 540 includes a top land 564. Piston 340 includes an abnormal combustion inhibitor 372, piston 440 includes an abnormal combustion inhibitor 472, and piston 540 includes an abnormal combustion inhibitor 572. Each of pistons 340, 440, and 540 is similar to piston 240, but illustrates variation in the top land and abnormal combustion inhibitor configurations that might be implemented. In piston 340 abnormal combustion inhibitor 372 would be understood to form a minority of an axial extent of top land 364. In piston 440, abnormal combustion inhibitor 472 would be understood to form a majority of an axial extent of top land 464. In piston 540, abnormal combustion inhibitor 572 would be understood to form a minority, for example, about ⅓, of an axial extent of top land 564, and also understood to be oriented, along with top land 564 itself, so as to slope radially inward and axially upward toward a combustion chamber. In any of the pistons of FIG. 5 or FIG. 6, the recurving groove surface profile can be expected to assist in limiting migration of oil from a crevice toward a combustion chamber, and based at least in part, upon the recurving shape also assist in directing recaptured oil back downward, for returning to a sub-crevice volume through ring clearances, cylinder liner grooves, or other structures.

Figure 7:
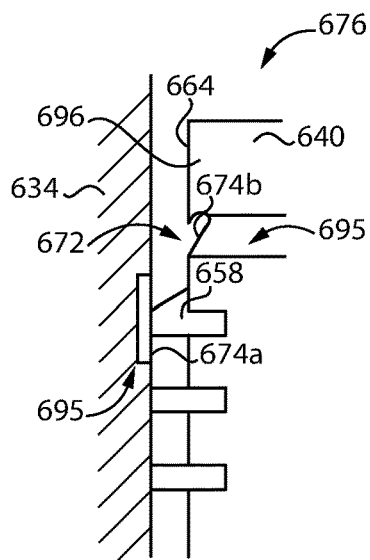
FIG. 7 is a detail view of a portion of a cylinder liner and piston assembly, according to another embodiment.

Turning to FIG. 7, there is shown an example of a cylinder liner and piston assembly 676 having an abnormal combustion inhibitor 672 that combines several of the structural features of other embodiments already discussed herein. Assembly 676 includes a piston 640 and a cylinder liner 634. Piston 640 includes a top land 664. Assembly 676 also includes an abnormal combustion inhibitor 672. A groove structure 695 of abnormal combustion inhibitor 672 has as a substrate both of piston 640 and cylinder liner 634. A first oil recapture surface 674*a* is formed in cylinder liner 634. A second oil recapture surface 674*b* is formed on piston 640 upon top land 664. Abnormal combustion inhibitor 672 and piston 640 also include an overhang 696, with oil recapture surface 674*b* formed upon an underside of overhang 696. It can also be noted that top ring 658 has a structure substantially the same as top ring 58 in the embodiment of FIGS. 1-3, although neither embodiment is limited with regard to top ring structure. Groove structure 695, including shapes and orientations of oil recapture surface 674*a* and oil recapture surface 674*b* may be the same as any of the oil recapture surfaces upon a cylinder liner or upon a piston discussed herein in connection with any of the other embodiments. Groove structures in any of the embodiments may have one ore more grooves with a groove path that spans, in an axial direction, at least one piston ring when the respective piston is at its TDC position, including only the top piston ring, the top two piston rings, or potentially more. Analogously, description or discussion of features or functionality can be understood to refer by way of analogy to any other embodiment except where stated otherwise or apparent from the context.

Figure 8:
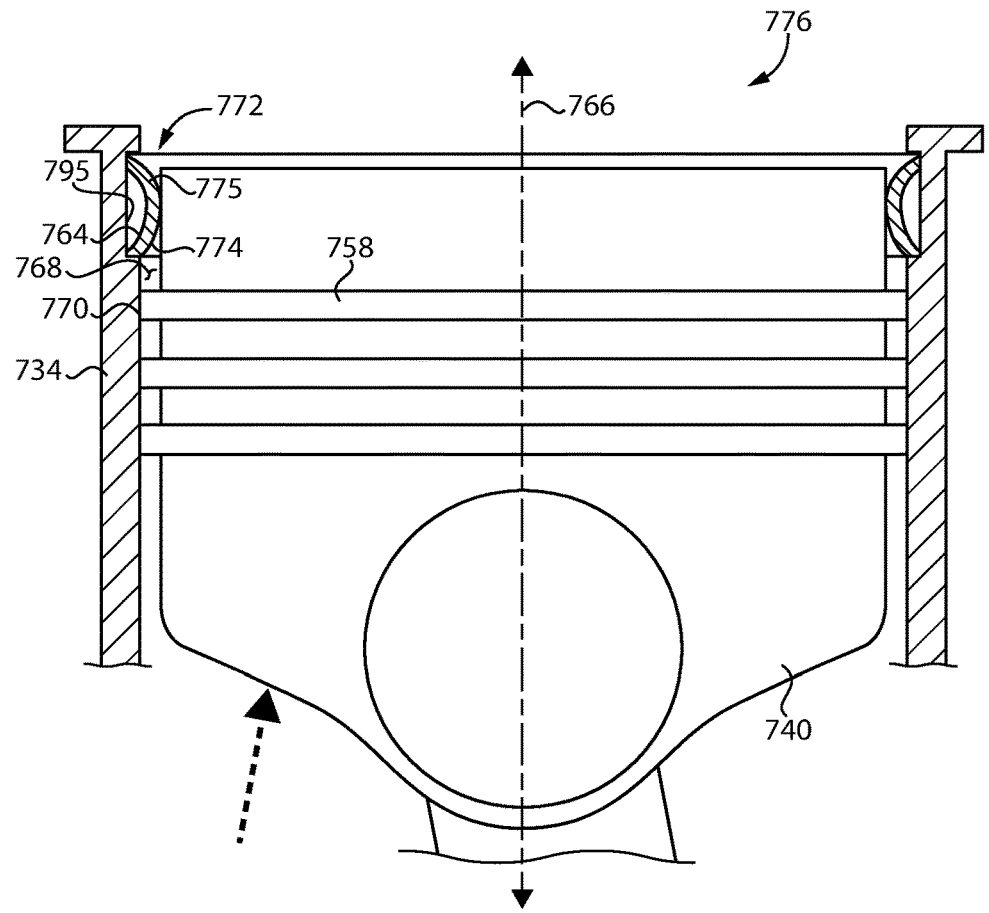
FIG. 8 is a partially sectioned side diagrammatic view of a cylinder liner and piston assembly, according to yet another embodiment.

Turning now to FIG. 8, there is shown yet another piston 740 defining a piston center axis 766 and forming, with a cylinder liner 734, a cylinder liner and piston assembly 776. Piston 740 includes a top ring 758. Assembly 776 also includes an abnormal combustion inhibitor 772 including an oil recapture surface 774 exposed to a crevice 768 and oriented to limit upward migration of oil from crevice 768 toward and into a combustion chamber. An oil entry clearance is shown at 770. Piston 740 includes a top land 764, and abnormal combustion inhibitor 772 includes a scraper 775 supported in cylinder liner 734 and in contact with top land 764 at a TDC position of piston 740. As piston 740 reciprocates up and down within cylinder liner 734 scraper 775 may come into and out of contact with top land 764. Scraper 775 can include an annular, relatively thin metal plate or spring that is seated within a groove 795 formed in cylinder liner 734. Oil upon piston 740 can be scraped and urged downward relative to piston 740, as piston 740 moves upward relative to stationary scraper 775. The contact between scraper 775 and top land 764 is expected to push upward migrated oil back down into, and eventually below, crevice 768. Groove structures 95 might include a single groove as illustrating and discussed below, or multiple separate grooves in circumferential succession.

Referring now to FIGS. 9-11 there are shown features of cylinder liner 34 in additional detail. Cylinder liner 34 includes an elongate cylindrical body 80 having an outer liner surface 82, and inner liner surface 84 defining liner center axis 86 extending between a first axial liner end 88 and a second axial liner end 90. Elongate cylindrical body 80 further includes a flange 92 projecting radially outward upon first axial liner end 88. As discussed above, abnormal combustion inhibitor 72 may include groove structure 95 having as a substrate cylinder liner 34. Cylinder liner 34 thus includes oil recapture surface 74, and forming an oil collection groove 73 of groove structure 95. Groove structure 95 may have a groove path that axially advances and circumferentially advances relative to liner center axis 86. In the illustrated embodiment, groove surface 74, and oil collection groove 73 formed thereby, forms a peak 96.

It will thus be apparent that groove surface 74 and oil collection groove 73 are oriented upon inner liner surface 84 in a path that is non-uniform, up and down relative to liner center axis 86. It has been discovered that the avoidance of edges, lips, or other surface features that would be parallel to piston rings can prevent piston rings being caught or snagged when passing a groove structure during moving between the TDC position and the BDC position of the piston. As shown in FIG. 11, oil collection groove 73 may have a first descending groove segment 97 and a second descending groove segment 98. FIG. 11 is an unrolled projection of inner liner surface 84, in other words representing what the subject portion of cylinder liner 34 might look like when cut and unrolled to a flat configuration. First descending groove segment 97 originates at peak 96 and terminates at a first groove end 99. Second descending groove segment 98 originates at peak 96 and terminates at a second groove end 100. An angle, circumferentially around liner center axis 86, between first groove end 99 and second groove end 100 may be greater than 180° and less than 360°. A 360° circumference is shown in FIG. 11 for comparison. As discussed above, it can be desirable to avoid presenting edges or other structures that can be snagged by a piston ring. A TDC line is shown in FIG. 11 corresponding approximately to where piston top ring 58 is located at the TDC position of piston 40. A BDC line is also shown in FIG. 11, corresponding approximately to where piston top ring 58 might be located at the BDC position of piston 40. It will be noted that the groove path formed by groove structure 95 extends both above and below the TDC line. Because the angle, circumferentially around liner center axis 86, between first groove end 99 and second groove end 100, is typically less than 360°, no groove surface structure is formed that is likely snagged by top ring 58 during reciprocation. Other groove paths according to the present disclosure that axially advance and circumferentially advance relative to a liner center axis are contemplated, and some embodiments could include groove paths that are fully circumferential. In the embodiment of FIGS. 9-11 an angle 101 formed between first descending groove segment 97 and second descending groove segment 98 is an obtuse angle. In other embodiments, angle 101 could be an acute angle. Moreover, in still other embodiments, descending groove segments could have profiles that are curvilinear in a projection as in FIG. 11.

Figure 12:
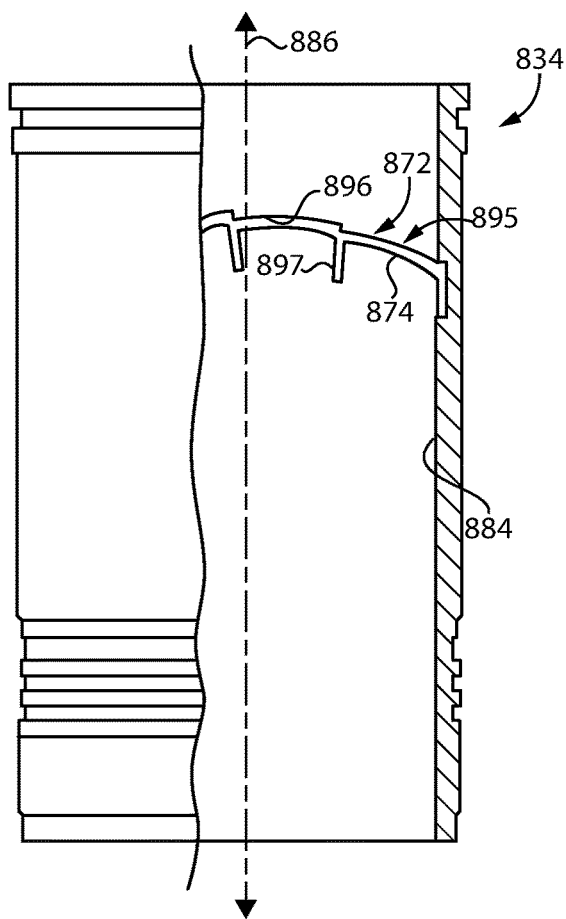
FIG. 12 is a partially sectioned side diagrammatic view of a cylinder liner, according to another embodiment.
Figure 13:
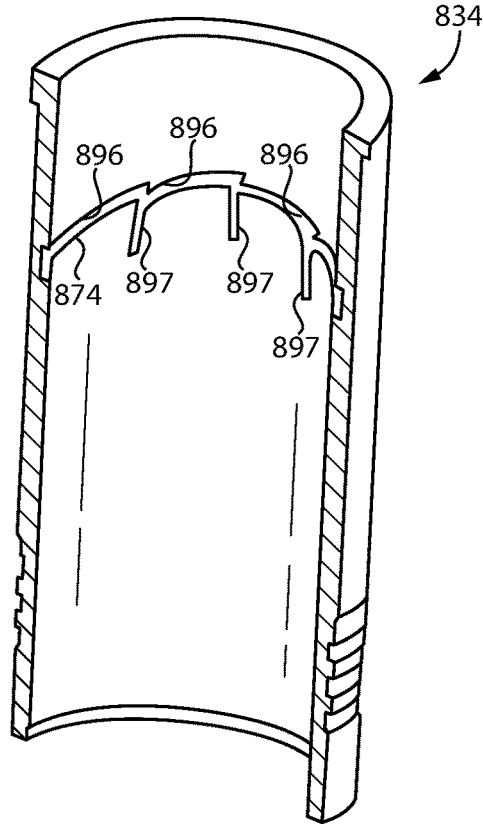
FIG. 13 is another sectioned view, in perspective, of the cylinder liner of FIG. 12.
Figure 14:
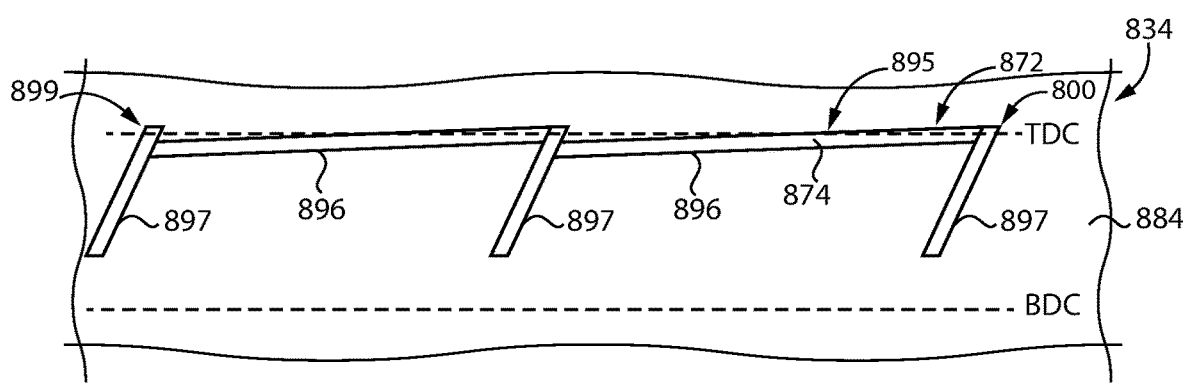
FIG. 14 is an unrolled projection view of a portion of the cylinder liner of FIGS. 12 and 13.

Referring now to FIGS. 12-14, there is shown a cylinder liner 834 according to another embodiment. Cylinder liner 834 has similarities to cylinder liner 34, but also certain differences. An inner liner surface is shown at 884, defining a liner center axis 886. Cylinder liner 834 also includes an abnormal combustion inhibitor 872 having an oil recapture surface 874 formed by a groove structure 895. In the embodiment of FIGS. 12-14, groove structure 895 forms a plurality of oil collection grooves 897 spaced circumferentially around liner center axis 886. Oil collection grooves 897 may have groove paths that axially advance and circumferentially advance relative to liner center axis 886. Also, groove structure 895 may include a plurality of cross grooves 896 connecting between adjacent ones of oil collection grooves 897. Cross grooves 896 may slope, relative to liner center axis 886, between the respective adjacent ones of oil collection grooves 897. Also, in a practical implementation, oil collection grooves 897 and cross grooves 896 may be arranged in a repeating pattern circumferentially around liner center axis 886. In FIG. 14, there is shown groove structure 895 and illustrating cross grooves 896 and oil collection grooves 897 extending between a first groove end 899 and a second groove end 900. An angle, circumferentially around liner center axis 886 from first groove end 899 to second groove end 800 could be less than 360° or might be substantially equal to 360°. In other words, groove structure 895 could be continuous, and form a repeating pattern, about a full inner circumference of cylinder liner 834. Alternatively, groove structure 895 could be formed so as to traverse less than 360°, analogous to the embodiment of FIGS. 9-11.

In the case of either of the cylinder liner embodiments of FIGS. 9-11 or FIGS. 12-14, it can be noted that the respective cylinder liners 34 and 834 include an axial upper half that extends downwardly from the respective first axial liner end, and an axial lower half that extends upwardly from the respective second axial liner end. Oil recapture surfaces 74 and 874, and thus oil collection grooves 73 and 897, are within the respective axial upper half of cylinder liners 34 and 834. This arrangement enables groove structures 95 and 895 to be positioned to be exposed to a crevice formed between a top land of a piston, and the respective inner liner surfaces 84 and 884. The arrangement of groove structures 95 and 895 also enables appropriate positioning with respect to the BDC and TDC positions of the respective piston. Moreover, it will be understood that cylinder liners 34 and 834 each define a liner axial length, in the embodiment of FIG. 9 extending from first axial liner end 88 to second axial liner end 90. Groove paths formed by groove structures 95 and 895 may define groove axial lengths or axial path components that are at least 2% of the liner axial length, and in a refinement from 2% to 12% of the liner axial length.

INDUSTRIAL APPLICABILITY

Referring to the drawings generally, but in particular reference to the embodiment of engine 10 depicted in FIG. 1, operating engine 12 can include moving piston 40 between the BDC position and the TDC position, and combusting a mixture containing a gaseous fuel and air, potentially also recirculated exhaust gas, pressurized in combustion chamber 36 based on the moving of piston 40 between the BDC position and the TDC position. Engine 10 may operate in a conventional four-stroke cycle, for example. Oil may be conveyed during operation from oil entry clearance 70 into crevice 68, as discussed herein. The oil conveyed into crevice 68 may impinge upon oil recapture surface 74 of abnormal combustion inhibitor 72, and be collected in oil collection groove 73. In the illustrated embodiment, oil collection groove 73 is formed in the wall of combustion chamber 36 as formed by inner liner surface 84.

Oil conveyed into crevice 68 may impinge upon oil recapture surface 74, and is thus limited from migration from crevice 68 toward combustion chamber 36. By limiting the migration of the oil in this manner, oil is prevented from entering combustion chamber 36 and thus limited from introduction into the mixture containing gaseous fuel and air where it risks causing abnormal combustion, as discussed herein. Continued reciprocation of piston 40, in a compression stroke or an intake stroke, can direct the oil through oil collection groove 73 back below oil entry clearance 70 based on at least one of the force of gravity or fluid pressure in combustion chamber 36, and thus recapturing at least some of the oil in sub-crevice volume 69. Recaptured oil can then return to a main oil gallery of engine 12 and/or continue to participate in lubrication and cooling of piston 40 and cylinder liner 34. Other embodiments of the present disclosure can operate generally analogously, but having different locations of oil impingement to limit migration toward and into a combustion chamber, consistent with the different arrangements and locations of the oil recapture surfaces and groove structures.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An engine comprising:
   an engine housing;
   a cylinder liner supported in the engine housing and forming a combustion chamber;
   a piston movable between a top-dead-center (TDC) position and a bottom-dead-center (BDC) position in the cylinder liner, and including an upper piston surface forming a combustion face, a lower piston surface positioned for impingement by engine oil, a top piston ring, and a top land extending between the top piston ring and the upper piston surface;

a crevice formed between the top land and the cylinder liner;

an oil entry clearance formed between the top ring and the cylinder liner; and an abnormal combustion inhibitor including an oil recapture surface exposed to the crevice and oriented to limit migration of oil from the crevice toward the combustion chamber.

2. The engine of claim 1 wherein the piston defines a piston center axis, and the orientation of the oil recapture surface includes an axial orientation component and a radial orientation component.

3. The engine of claim 2 wherein the abnormal combustion inhibitor includes a scraper supported in the cylinder liner and in contact with the top land at the TDC position of the piston.

4. The engine of claim 2 wherein the abnormal combustion inhibitor includes a groove structure having as a substrate at least one of the cylinder liner or the piston.

5. The engine of claim 4 wherein the oil recapture surface includes a groove surface upon the piston and extending circumferentially around the piston center axis.

6. The engine of claim 5 wherein the oil recapture surface is one of a plurality of oil recapture surfaces of the abnormal combustion inhibitor arranged at a plurality of axial locations upon the top land.

7. The engine of claim 5 wherein the abnormal combustion inhibitor includes an overhang, and the groove surface is formed at least in part upon an underside of the overhang and has a profile that is recurving relative to the piston center axis.

8. The engine of claim 4 wherein the substrate of the groove structure includes both the piston and the cylinder liner.

9. The engine of claim 1 wherein the top piston ring includes an upper ring face that slopes radially outward and downward in a direction of the oil entry clearance.

10. A method of operating an engine comprising:

moving a piston in the engine between a bottom-dead-center (BDC) position (BDC) and a top-dead-center (TDC) position;

combusting a mixture containing a gaseous fuel and air pressurized in the combustion chamber based on the moving of the piston between the BDC position and the TDC position;

conveying oil into a crevice formed between a top land of the piston and the cylinder liner;

impinging the oil conveyed into the crevice upon an oil recapture surface of an abnormal combustion inhibitor; and limiting migration of the oil from the crevice toward the combustion chamber based on the impingement of the oil upon an oil recapture surface, so as to inhibit abnormal combustion in the combustion chamber.

11. The method of claim 10 wherein the conveying of the oil into the crevice includes conveying the oil through a clearance formed between a top ring of the piston and the cylinder liner.

12. The method of claim 11 further comprising returning at least some of the oil to a sub-crevice volume based on the impingement of the oil upon the oil recapture surface.

13. The method of claim 10 wherein the impinging of the oil upon the oil recapture surface includes impinging the oil upon a groove surface of a groove structure having the piston as a substrate.

14. The method of claim 10 wherein the groove surface is formed at least in part upon the underside of an overhang formed by the piston.

15. A piston for an internal combustion engine comprising:

a piston body defining a piston center axis extending between a first axial piston body end including an upper piston surface forming a combustion face, and a second axial piston body end including a lower piston surface;

the piston body further including a top ring groove extending circumferentially around the piston center axis, and a top land extending circumferentially around the piston center axis, and axially between the top ring groove and the combustion face;

a top ring seated in the top ring groove and including an outer ring edge, and the outer ring edge is located radially outward of the top land, such that the piston is structured to form, together with an inner surface of a cylinder liner, a crevice extending circumferentially around the piston and radially outward from the top land, and an oil entry clearance to the crevice extending circumferentially around the top ring and radially outward from the outer ring edge; and the piston further including an abnormal combustion inhibitor having an oil recapture surface, the oil recapture surface being located axially between the top ring groove and the upper surface, and oriented according to an axial orientation component and a radial orientation component to limit migration of oil from the crevice toward a combustion chamber formed in part by the combustion face.

16. The piston of claim 15 wherein the abnormal combustion inhibitor includes a groove structure, and the oil recapture surface includes a groove surface extending circumferentially around the top land.

17. The piston of claim 16 wherein the oil recapture surface is one of a plurality of oil recapture surfaces of the abnormal combustion inhibitor, each including a groove surface extending circumferentially around the top land, and arranged at a plurality of axial locations between the top piston ring and the combustion face.

18. The piston of claim 17 wherein the plurality of groove surfaces each have at least one of a groove depth or a groove width that is less than, respectively, a groove depth or a groove width, of the top ring groove.

19. The piston of claim 16 wherein the abnormal combustion inhibitor includes an overhang, and the groove surface is formed at least in part upon an underside of the overhang.

20. The piston of claim 19 wherein the groove surface has a profile that is recurving relative to the piston center axis.

* * * * *